United States Patent
Yang et al.

(10) Patent No.: US 9,663,600 B2
(45) Date of Patent: May 30, 2017

(54) METHOD OF FABRICATING AN ELECTROLYTE MATERIAL

(71) Applicants: AUDI AG, Ingolstadt (DE); TOYOTA JIDOSHA KABUSHIKI KAISHA, Toyota-Shi (JP); THE BOARD OF TRUSTEES OF THE UNIVERSITY OF ALABAMA, THE UNIVERSITY OF ALABAMA, Tuscaloosa, AL (US)

(72) Inventors: Zhiwei Yang, South Windsor, CT (US); Mallika Gummalla, Longmeadow, MA (US); Yoichi Hosokawa, Ann Arbor, MI (US); Joseph S. Thrasher, Seneca, SC (US); Todd S. Sayler, Tuscaloosa, AL (US); Andrej Matsnev, Anderson, SC (US); Richard Edward Fernandez, Anderson, SC (US); Alfred Waterfeld, Freren (DE)

(73) Assignees: Audi AG, Ingolstadt (DE); Toyota Jidosha Kabushiki Kaisha, Toyota-Shi (JP); The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 14/654,451

(22) PCT Filed: Dec. 21, 2012

(86) PCT No.: PCT/US2012/071358
§ 371 (c)(1),
(2) Date: Jun. 19, 2015

(87) PCT Pub. No.: WO2014/098907
PCT Pub. Date: Jun. 26, 2014

(65) Prior Publication Data
US 2015/0337064 A1    Nov. 26, 2015

(51) Int. Cl.
| | | |
|---|---|---|
| C08F 8/32 | (2006.01) | |
| C08F 214/26 | (2006.01) | |
| H01M 8/1039 | (2016.01) | |
| H01M 8/1088 | (2016.01) | |
| C08J 5/22 | (2006.01) | |

(52) U.S. Cl.
CPC ............ *C08F 214/262* (2013.01); *C08F 8/32* (2013.01); *C08J 5/225* (2013.01); *H01M 8/1039* (2013.01); *H01M 8/1088* (2013.01); *C08J 2327/18* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 3,282,875 | A | * | 11/1966 | Connolly ............... C07C 309/82 524/795 |
| 5,463,005 | A | | 10/1995 | Desmarteau |
| 5,608,022 | A | * | 3/1997 | Nakayama .......... C08F 214/262 526/212 |
| 5,869,416 | A | | 2/1999 | Mussell |
| 5,882,810 | A | | 3/1999 | Mussell et al. |
| 6,106,963 | A | | 8/2000 | Nitta et al. |
| 6,232,264 | B1 | | 5/2001 | Lukehart et al. |
| 6,277,512 | B1 | | 8/2001 | Hamrock et al. |
| 6,294,612 | B1 | | 9/2001 | O'Brien |
| 6,733,914 | B1 | * | 5/2004 | Grot ........................ C08J 5/225 429/494 |
| 7,112,363 | B2 | | 9/2006 | Moya |
| 7,288,600 | B2 | | 10/2007 | Moya |
| 7,507,495 | B2 | | 3/2009 | Wang et al. |
| 7,615,307 | B2 | | 11/2009 | Wu et al. |
| 7,691,780 | B2 | | 4/2010 | Adzic et al. |
| 7,740,974 | B2 | | 6/2010 | Masel et al. |
| 7,837,901 | B2 | | 11/2010 | Hsu et al. |
| 7,855,021 | B2 | | 12/2010 | Adzic et al. |
| 7,906,052 | B2 | | 3/2011 | Hadj Romdhane et al. |
| 8,216,680 | B2 | | 7/2012 | Hsu et al. |

(Continued)

FOREIGN PATENT DOCUMENTS

| | | |
|---|---|---|
| CN | 1201554 A | 12/1998 |
| CN | 1964115 A | 5/2007 |

(Continued)

OTHER PUBLICATIONS

Xue, "Chemistry of Bis(perfluoroalkylsulfonyl)imides and Related Compounds," Dissertation presented to the Graduate School of Clemson University, Aug. 1996, 251 pages.

Creager et al., "New Bis[(perfluororalkyl)sulfonyl]imide Ionomers for PEM Fuel Cells," Polymeric Materials: Science and Engineering 80, 600 (1999).

Zhou, "Synthesis and Characterization of Perfluorinated Sulfonimide Copolymers as Polymer Electrolyte Membranes," Dissertation presented to the Graduate School of Clemson University, Dec. 2002, 212 pages.

(Continued)

*Primary Examiner* — Robert C Boyle
(74) *Attorney, Agent, or Firm* — Seed IP Law Group LLP

(57) ABSTRACT

A method of fabricating low EW, water insoluble electrolyte materials includes providing a perfluorinated polymer resin that includes perfluorinated carbon-carbon backbone chain and sulfonyl fluoride ended perfluorinated side chains, extending from the perfluorinated backbone chains via an ether linkage, exposing the perfluorinated polymer resin to ammonia gas to convert the sulfonyl fluoride groups to sulfonamide groups, $-SO_2-NH_2$, which reacts with sulfonyl fluoride containing chemical agent(s) to form sulfonimide groups, and at the same time, generates low EW, 3-dimensional cross-linked, water-insoluble perfluorinated polymer electrolyte materials.

23 Claims, 1 Drawing Sheet

(56) References Cited

U.S. PATENT DOCUMENTS

| | | |
|---|---|---|
| 2002/0160272 A1 | 10/2002 | Tanaka et al. |
| 2003/0096156 A1 | 5/2003 | Asaoka et al. |
| 2004/0241518 A1 | 12/2004 | Yang |
| 2005/0075240 A1 | 4/2005 | Yamamoto |
| 2005/0095487 A1 | 5/2005 | Hamrock et al. |
| 2005/0112434 A1 | 5/2005 | Park et al. |
| 2005/0113528 A1 | 5/2005 | Jing et al. |
| 2005/0186467 A1 | 8/2005 | Sugiura |
| 2006/0093885 A1 | 5/2006 | Krusic et al. |
| 2007/0069185 A1 | 3/2007 | Hsu et al. |
| 2007/0218342 A1 | 9/2007 | Han et al. |
| 2007/0281199 A1* | 12/2007 | Lousenberg ............ C08J 5/225 429/483 |
| 2007/0282023 A1* | 12/2007 | Lousenberg ............ C08J 3/09 521/27 |
| 2008/0206616 A1 | 8/2008 | Atanassova et al. |
| 2008/0292931 A1 | 11/2008 | Schwartz et al. |
| 2009/0026944 A1 | 1/2009 | Riviere-Cazaux |
| 2009/0053576 A1 | 2/2009 | Wu |
| 2009/0075139 A1 | 3/2009 | Kucernak et al. |
| 2009/0220682 A1 | 9/2009 | Monnier et al. |
| 2009/0269644 A1* | 10/2009 | Hamrock ............ C07F 9/3834 429/413 |
| 2010/0008840 A1 | 1/2010 | Zhong et al. |
| 2010/0086831 A1 | 4/2010 | Fisher et al. |
| 2010/0086832 A1 | 4/2010 | Lopez et al. |
| 2010/0092841 A1 | 4/2010 | Lopez et al. |
| 2010/0099012 A1 | 4/2010 | Adzic |
| 2010/0216632 A1 | 8/2010 | Adzic et al. |
| 2010/0316937 A1 | 12/2010 | Sakamoto et al. |
| 2011/0200915 A1 | 8/2011 | Goto et al. |
| 2011/0223444 A1 | 9/2011 | Brown et al. |
| 2012/0046164 A1 | 2/2012 | Tanaka et al. |
| 2012/0251926 A1 | 10/2012 | Shirvanian |
| 2013/0059219 A1 | 3/2013 | Kimura et al. |
| 2013/0281555 A1 | 10/2013 | Yang et al. |
| 2013/0295486 A1 | 11/2013 | Shao |
| 2013/0319871 A1 | 12/2013 | Murata et al. |
| 2013/0330657 A1 | 12/2013 | Shoemaker et al. |
| 2014/0038078 A1 | 2/2014 | Shao |
| 2014/0178575 A1 | 6/2014 | Iio et al. |
| 2015/0255798 A1 | 9/2015 | Shao |
| 2015/0333354 A1 | 11/2015 | Yang et al. |
| 2015/0340721 A1 | 11/2015 | Yang et al. |

FOREIGN PATENT DOCUMENTS

| | | |
|---|---|---|
| CN | 1973391 A | 5/2007 |
| CN | 101318131 A | 12/2008 |
| CN | 101875010 A | 11/2010 |
| CN | 102039124 A | 5/2011 |
| JP | H10340732 A | 12/1998 |
| JP | 2000-188013 A | 7/2000 |
| JP | 2002-042825 A | 2/2002 |
| JP | 2002212234 A | 7/2002 |
| JP | 2002-324559 A | 11/2002 |
| JP | 2003-246906 A | 9/2003 |
| JP | 2005-248104 A | 9/2005 |
| JP | 2005-272970 A | 10/2005 |
| JP | 2007-157645 A | 6/2007 |
| JP | 2008-186798 A | 8/2008 |
| JP | 2008-210572 A | 9/2008 |
| JP | 2009-054339 A | 3/2009 |
| JP | 2009-539225 A | 11/2009 |
| JP | 2010-089031 A | 4/2010 |
| JP | 2010-092799 A | 4/2010 |
| JP | 2010-214330 A | 9/2010 |
| JP | 2011040363 A | 2/2011 |
| JP | 2011-089143 A | 5/2011 |
| JP | 2011-134477 A | 7/2011 |
| JP | 2011-137216 A | 7/2011 |
| JP | 2011-218278 A | 11/2011 |
| JP | 2012-102345 A | 5/2012 |
| JP | 2012226970 A | 11/2012 |
| JP | 5699287 B2 | 4/2015 |
| WO | 97/13287 A2 | 4/1997 |
| WO | 2005/045978 A2 | 5/2005 |
| WO | 2007/142884 A2 | 12/2007 |
| WO | 2009/045879 A2 | 4/2009 |
| WO | 2009/139747 A1 | 11/2009 |
| WO | 2009/139748 A1 | 11/2009 |
| WO | 2009/139749 A1 | 11/2009 |
| WO | 2010/048407 A1 | 4/2010 |
| WO | 2010/107426 A1 | 9/2010 |
| WO | 2010/123896 A2 | 10/2010 |
| WO | 2010/132050 A1 | 11/2010 |
| WO | 2011/112608 A1 | 9/2011 |
| WO | 2011129967 A2 | 10/2011 |
| WO | 2011/148466 A1 | 12/2011 |
| WO | 2012-096653 A1 | 7/2012 |
| WO | WO 2012/096653 * | 7/2012 |
| WO | 2012/105107 A1 | 8/2012 |
| WO | 2012/174463 A1 | 12/2012 |

OTHER PUBLICATIONS

Uematsu et al., "Synthesis of novel perfluorosulfonamide monomers and their application," Journal of Flourine Chemistry 127, 1087-1095 (2006).

Alcaide et al., "Performance of carbon-supported PtPd as catalyst for hydrogen oxidation in the anodes of proton exchange membrane fuel cells," *International Journal of Hydrogen Energy* 35:11634-11641, 2010.

Greeley et al., "Theoretical Trends in Particle Size Effects for the Oxygen Reduction Reaction," *Zeitschrift fur Physikalische Chemie* 221(9-10):1209-1220, 2007.

Hao et al., "Synthesis of monodisperse palladium nanocubes and their catalytic activity for methanol electrooxidation", Chin. Phys. B vol. 19, No. 10 (2010), 106104-1-106104-5.

Kondo et al., "Active Sites for the Oxygen Reduction Reaction on the Low and High Index Planes of Palladium," *The Journal of Physical Chemistry Letters C* 113(29):12625-12628, 2009.

Lim et al., "Facile Synthesis of Bimetallic Nanoplates Consisting of Pd Cores and Pt Shells through Seeded Epitaxial Growth," *Nano Letters* 8(8):2535-2540, 2008.

Lim et al., "Pd-Pt Bimetallic Nanodendrites with High Activity for Oxygen Reduction," *Science* 324:1302-1305, Jun. 2009.

Neburchilov et al., "A review of polymer electrolyte membranes for direct methanol fuel cells," *Journal of Power Sources* 169:221-238, 2007.

Niu et al., "Seed-Mediated Growth of Nearly Monodisperse Palladium Nanocubes with Controllable Sizes," *Crystal Growth & Design* 8(12):4440-4444, 2008.

Stamenkovic et al., "Improved Oxygen Reduction Activity on $Pt_3Ni(111)$ via Increased Surface Site Availability," *Science* 315:493-497, 2007.

Tao et al., "Shape Control of Colloidal Metal Nanocrystals," *small* 4(3):310-325, 2008.

Vidal-Iglesias et al., "Pd Adatom Decorated (100) Preferentially Oriented Pt Nanoparticles for Formic Acid Electrooxidation," *Angewandte Chemi International Edition* 122:7152-7155, 2010.

Zhang et al., "Platinum Monolayer Electrocatalysts for $O_2$ Reduction: Pt Monolayer on Pd(111) and on Carbon-Supported Pd Nanoparticles," *J. Phys. Chem. B* 108:10955-10964, 2004.

Zhang et al., "Platinum Monolayer on Nonnoble Metal-Noble Metal Core-Shell Nanoparticle Electrocatalysts for $O_2$ Reduction," *J. Phys. Chem. B* 109(48):22701-22704, 2005.

Zhou et al., "Palladium alloy catalyst research to formic acid catalytic performance," *The 8th National Academic Conference of Hydrogen Energy*, Oct. 12, 2007 (w/ partial English translation), 4 pages.

* cited by examiner

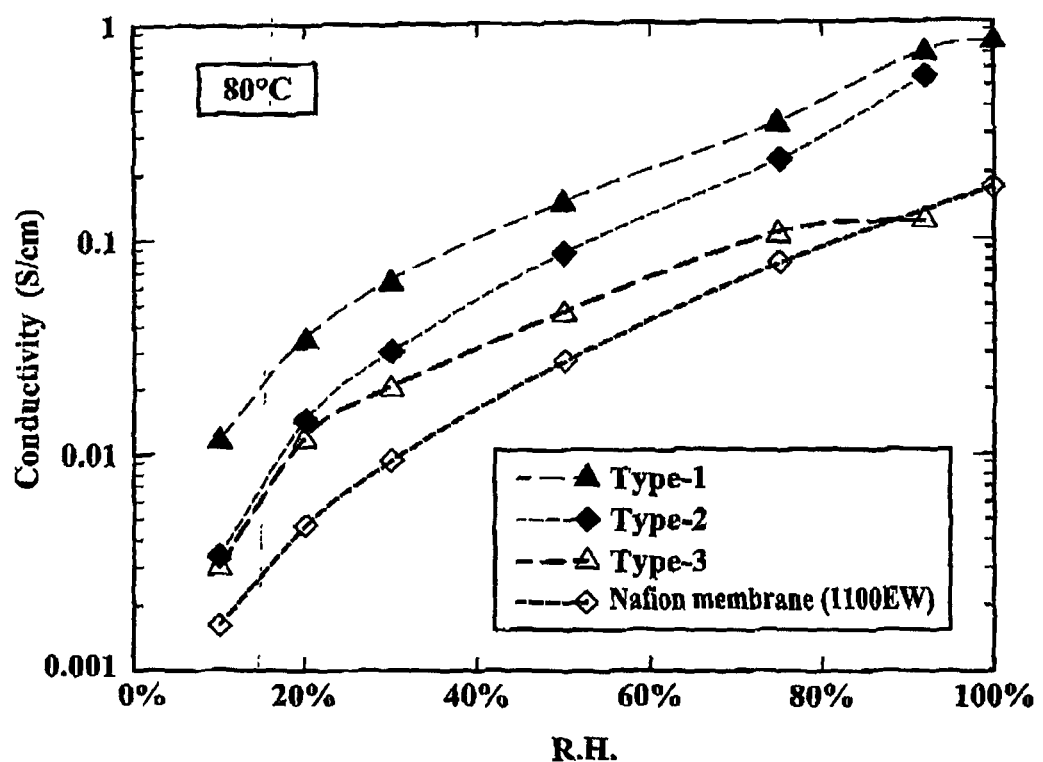

METHOD OF FABRICATING AN ELECTROLYTE MATERIAL

BACKGROUND

Technical Field

This disclosure relates to polymer electrolyte materials, such as those used in proton exchange membrane (PEM) fuel cells.

Description of the Related Art

Fuel cells are commonly used for generating electric current. A single fuel cell typically includes an anode electrode, a cathode electrode, and an electrolyte between the anode and cathode electrodes for generating an electric current in a known electrochemical reaction between a fuel and an oxidant. The electrolyte may be a polymer membrane, which is also known as a proton exchange membrane or "PEM."

One common type of polymer exchange membranes is per-fluorinated sulfonic acid (PFSA) polymer membrane, such as NAFION® (E. I. du Pont de Nemours and Company). PFSA polymer consists of a perfluorinated carbon-carbon backbone, to which are attached perfluorinated side chains. Each side chain terminates in a sulfonic acid group that works as a proton exchange site to transfer or conduct protons between the anode and cathode electrodes.

The proton conductivity of PFSA polymers varies in relation to relative humidity (RH) and temperature. The relation between conductivity and level of hydration is based on two different mechanisms of proton transport. One is the vehicular mechanism, where the proton transport is assisted by the water in the membrane, and the other is the hopping mechanism, where the proton hops along the sulfonic acid sites. While vehicular mechanism is dominant at high relative humidity conditions, the hopping mechanism becomes important at low relative humidity conditions.

PEM fuel cells, especially for automobile applications, are required to be able to operate at high temperature ($\geq 100°$ C.) and low RH ($\leq 25\%$ RH) conditions, in order to reduce the radiator size, simplify the system construction and improve overall system efficiency. Consequently, PEM materials with high proton conductivity at high temperature and low RH conditions are needed.

PFSA polymer is usually prepared by free radical copolymerization of tetrafluoroethylene (TFE) and per-fluorinated (per-F) vinyl ether monomer (such as perfluoro-2-(2-fluorosulfonylethoxy) propyl vinyl ether, or "PSEPVE", for Nafion®). One approach to produce a PFSA polymer with improved proton conductivity is to decrease the TFE content in the product polymer. An indicator of conductivity of an electrolyte material is equivalent weight (EW), or grams of polymer required to neutralize 1 mol of base. The most common equivalent weights of commercially available PFSA polymers (such as NAFION®) are between ~800 and ~1100 g/mol, which provide a balance between conductivity and mechanical properties. While PFSA polymer with EW in this range is needed, increasing conductivity below a certain EW threshold, saying ~700 g/mol, renders the electrolyte water soluble and not suitable for PEM applications.

Per-F sulfonimide (SI) acids (such as Bis (trifluoromethane) sulfonimide, $CF_3$—$SO_2$—NH—$SO_2$—$CF_3$) show favorable properties, including strong acidity, excellent chemical and electrochemical stability, for PEM fuel cell applications. Linear per-F sulfonimide polymers (PFSI), prepared by copolymerization of TFE and SI-containing per-F vinyl ether monomer, were first reported by DesMarteau, et al. (U.S. Pat. No. 5,463,005). Such type of linear PFSI polymers with the EW in the range of 1175-1261 g/mol for PEM application was reported by Creager, et at (Polymeric materials: science and engineering—WASHINGTON—80, 1999: 600). Per-F vinyl ether monomer that contains two SI groups was also synthesized, and the corresponding linear PFSI polymer with the EW of 1175 g/mol was prepared and demonstrated to have high thermal and chemical stability in PEM fuel cell operating conditions (Zhou, Ph.D. thesis 2002, Clemson University). Reducing TFE content in the PFSI polymers is an efficient way to increase the proton conductivity of the product polymers. Linear PFSI polymer with the EW of 970 g/mol was reported in the literature (Xue, thesis 1996, Clemson University). However, such type of linear PFSI polymers with even lower EW is difficult to synthesis through free-radical copolymerization process and also renders the polymer water soluble below a certain EW threshold.

The preparation of PFSI polymer with calculated EW of ~1040 by chemical modification of PFSA polymer resin (in —$SO_2$—F form) was reported in a Japanese patent (Publication No: 2002212234). Furthermore, a more efficient chemical modification process was reported by Hamrock et al. (Publication No. WO 2011/129967). In this process, a linear PFSA polymer resin (in —$SO_2$—F form) was treated with ammonia in acetonitrile (ACN) to convert the —$SO_2$—F groups to sulfonamide (—$SO_2$—$NH_2$) groups, which then reacted with a per-F disulfonyl difluoride compound (such as F—$SO_2$—$(CF_2)_3$—$SO_2$—F) to convert to —$SO_2$—NH—$SO_2$—$(CF_2)_3$—$SO_3H$ in the final product. By starting with a 3M's PFSA (in —$SO_2$—F form) with EW of ~800 g/mol, water-insoluble polymer electrolyte with EW as low as ~625 g/mol was reported. However, polymer electrolyte with even lower EW (<625 g/mol) resulted in a water soluble polymer and hence is not suitable for PEM applications.

Cross-linking is known as an effective strategy to prevent polymers from being soluble in water and organic solvents. This step is known to improve polymers' mechanical strength. Cross-linking PFSA polymer (in —$SO_2$—F form) can be achieved by a coupling reaction of a sulfonyl fluoride (—$SO_2$—F) group and a sulfonamide ($NH_2$—$SO_2$—) group to form a sulfonimide acid (—$SO_2$—NH—$SO_2$—). The resulting sulfonimide group also works as a proton conducting site.

Uematsu et al. (Journal of Fluorine Chemistry 127 (2006) 1087-1095) reported using thermal treatment (270° C.) to couple sulfonyl fluoride groups and sulfonamide groups in terpolymers of TFE, PSEPVE and sulfonamide-containing per-F vinyl ether monomer to form sulfonimide groups as cross-linking sites in the polymer matrix. An improvement in mechanical strength of polymer matrix was shown, without reduction in equivalent weight.

Hamrock et al. (US2009/041614, US2006/0160958, US2005/0113528, U.S. Pat. No. 7,060,756, EP1690314) proposed to use aromatic cross-linking agents to react with PFSA polymer (in —$SO_2$—F and/or —$SO_2$—Cl form) to generate aromatic sulfone-containing cross-links in the polymer matrix. The proposed reaction conditions include thermal treatment at high temperature (160° C. or higher) and with a Lewis acid as catalyst. The proposed product polymer may have EW lower than 900 g/mol. The even lower EW ($\leq 700$ g/mol) cross-linked polymer products were not mentioned in these patents. In addition, the introduction of aromatic ring structures into the polymer matrix compromised chemical stability and could lead to inferior durability of product polymer membranes in highly acidic and highly oxidizing conditions in PEM fuel cells.

BRIEF SUMMARY

A method of fabricating water insoluble, low EW perfluorinated polymer electrolyte materials includes providing a low EW perfluorinated polymer resin that includes perfluorinated carbon-carbon backbone and perfluorinated side chains that extend from the perfluorinated carbon-carbon backbone chain and terminate in a sulfonyl fluoride, —$SO_2$—F. The perfluorinated polymer resin is exposed to ammonia gas to convert the sulfonyl fluoride groups to sulfonamide groups, —$SO_2$—$NH_2$. The perfluorinated polymer in sulfonamide form is contacted with chemical agent(s) to convert sulfonamide to sulfonimide, —$SO_2$—NH—$SO_2$—, in a 3-dimensional cross-linked, low EW, water-insoluble perfluorinated polymer electrolyte material.

BRIEF DESCRIPTION OF THE SEVERAL VIEWS OF THE DRAWINGS

The FIGURE is a graph of the conductivity of various polymer products in relation to relative humidity.

DETAILED DESCRIPTION

The disclosed example proton exchange materials may be used as proton exchange membranes for PEM fuel cells or other applications where proton exchange is desirable. As will be described, the disclosed proton exchange material provides the ability to increase the density of proton exchange sites while maintaining resistance to solvents, such as water. As a comparison, an increase in the density of proton exchange sites by simply decreasing TFE content in PFSA polymers increases proton conductivity but also increases the polymer solubility in water, which is detrimental in PEM fuel cell applications. Conversely, a decrease in the density of proton exchange sites by simply increasing TFE content in PFSA polymers enhances polymers' water stability but decreases proton conductivity and debits PEM fuel cell performance.

An example proton exchange material includes perfluorinated carbon-carbon backbone chains and perfluorinated side chains extending off of the perfluorinated carbon-carbon backbone chains via an ether linkage. The perfluorinated side chains that have one or more sulfonimide (SI) groups, —$SO_2$—NH—$SO_2$—.

In embodiments, the perfluorinated carbon-carbon backbone chains have a structure of —$(CF_2—CH_2)_N$—$CF_2$—CF(—O—$R_A$—$R_B$)—, where N on average is greater than or equal to zero, $R_A$ is a linear or branched perfluorinated chain, which includes a general structure of —$C_XF_{2X}O_Z$—, where X is greater than or equal to two and Z is greater than or equal to zero. $R_B$ is a linear or branched perfluorinated chain, which contains one or more SI groups and ends with a —$CF_3$ group or a —$SO_3H$ group, or covalently links to another $R_A$.

In embodiments, the side chains that extend off of the backbone chains may be end-capped chains, cross-link chains, or both. The end-capped chains may have at least one SI group, —$SO_2$—NH—$SO_2$—, and may include between two and five of SI groups or even greater than five SI groups. Additionally, the end-capped chains may be ending with a —$CF_3$ group or a —$SO_3H$ group. The portion of end-capped chains that are ended with —$CF_3$ may include multiple SI groups and the portion of end-capped chains that are ended with —$SO_3H$ may include at least one SI group. The cross-link chains may contain at least two SI groups and covalently link to the same or different polymer backbone chains.

In the proton exchange material, 20-99% of the perfluorinated side chains may be the end-capped chains and 80-1% of the side chains may be the cross-link chains. In other examples, 50-99% of the perfluorinated side chains are the end-capped chains and 50-1% of the side chains are the cross-link chains.

In one example, the proton exchange material has Structure 1 shown below, where N on average is greater than or equal to zero, $R_A$ is a linear or branched perfluorinated chains, which includes a general structure of —$C_XF_{2X}O_Z$—, where X is greater than or equal to two and Z is greater than or equal to zero. SI is sulfonimide group, $R_{C1}$, $R_{C2}$ and $R_{C3}$ are independently selected from —$(CF_2)_y$— where y is 1-6 and —$(CF_2)_{y'}$—O—$(CF_2)_{y'}$— where y' is 1-4, m, m', n and n' are greater than or equal to 1. m, m', n and n' may be equal to or different than each other, z is greater than or equal to zero. It is also understood that the end-capped chains and cross-link chains may occur randomly on the perfluorinated carbon-carbon backbone chains. The amounts of end-capped chains and cross-link chains may be as described above.

Structure 1

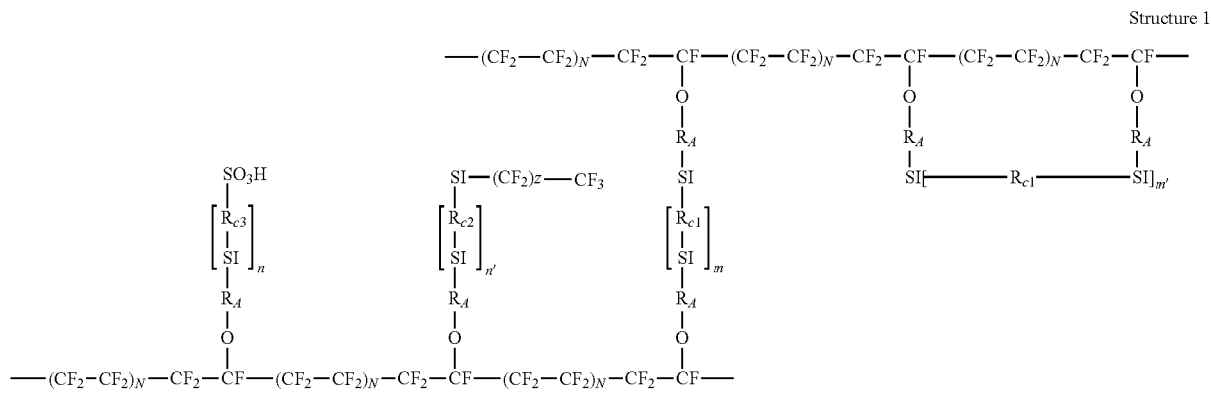

A user may design the proton exchange material of the disclosed examples with a selected number of SI groups, backbone structure and side chain structure to provide a desired EW of proton exchange sites.

The EW of the proton exchange material may generally be less than 850. In further examples, the equivalent weight is less than 700. In further examples, the equivalent weight is less than 625. The disclosed range provides relatively high proton conductivity and a suitable rheology for membranes and electrode ionomers desired for a PEM fuel cell or other applications.

A method of fabricating such an electrolyte material, or proton exchange material, includes (A) preparing a perfluorinated polymer resin that includes perfluorinated carbon-carbon backbone and perfluorinated side chains that extend from the perfluorinated backbone chains with an ether linkage and terminate in a sulfonyl fluoride group, —$SO_2$—F, (B) exposing the perfluorinated polymer resin to ammonia gas to cause a conversion of —$SO_2$—F groups to sulfonamide groups, —$SO_2$—$NH_2$ and (C) treating the perfluorinated polymer having —$SO_2$—$NH_2$ groups with a sulfonyl fluoride-containing agent to convert at least a portion of —$SO_2$—$NH_2$ groups to SI groups, —$SO_2$—NH—$SO_2$—.

(D) can be used to treat the polymer product from the step (C) with more of the sulfonyl fluoride-containing agent, or a different sulfonyl fluoride-containing agent, to convert the unreacted sulfonamide groups (if have) to SI groups. Step D is optional.

The disclosed SI chemistry creates cross-links that prevent the low EW polymer from being water soluble and thus permit the usage in electrochemical applications. In prior known linear PFSA polymers with low EW are water soluble and unusable for PEM fuel cells.

The electrolyte material produced according to the exemplary method could have EW of less than 700 and provide excellent proton conductivity in high temperature and low relative humidity conditions, while maintaining good chemical and mechanical stability in comparison to prior electrolyte materials.

The perfluorinated polymer resin of step (A) can be synthesized through a free radical polymerization step. Step (B) may be referred to as an amidification step, step (C) may be referred to as a gelation step and optional step (D) is a post-treatment step. The following illustrate non-limiting examples of steps (A), (B), (C) and (D). Where appropriate, the following abbreviations are used herein:

° C.: degrees Celsius
3P: bis(pentafluoropropionyl) peroxide
4P: bis(heptafluorobutyryl) peroxide
ACN: acetonitrile
atm: atmosphere
DSC: differential scanning calorimetry
EW: equivalent weight
g: grams
HFC 43-10: 2,3-dihydrodecafluoropentane
M: molarity
mtorr: millitorr
PSEPVE: perfluoro-2-(2-fluorosulfonylethoxy) propyl vinyl ether
POPS: perfluoro 3-oxa-4-pentene-sulfonylfluoride, $CF_2$=CF—O—$CF_2CF_2$—$SO_2$—F
psig: pounds per square inch gauge
RH: relative humidity
rpm: rotations per minute
TFE: tetrafluoroethylene
TGA: thermal gravimetric analysis Step (A): Free Radical Polymerization The perfluorinated polymer resin is produced by free radical polymerization of TFE and per-F vinyl ether monomer (such as PSEPVE or POPS). In one example of the polymerization, a molar ratio of TFE to per-F vinyl ether monomer is approximately 3:1 or less, resulting in polymer resins of low EW (less than ~750). In a further example, the polymerization is carried out with per-F vinyl ether monomer only, which produces the homopolymer of the monomer with the lowest EW (as low as ~280).

The following examples illustrate further details of the polymer resin synthesis.

Example A-1

TFE+PSEPVE Copolymerization

A typical run involves adding 200 g of HFC 43-10 and 550 g of PSEPVE to a 600-mL autoclave and degassing the solution by freeze-pump-thawing 5 times to remove all oxygen. The autoclave is then filled with nitrogen to 0 psig and heated to 40° C. with stirring at a rate of 200 rpm. At the same time, the initiator feed line is cooled to −30° C.

The autoclave is pressurized to 105 psig using an equimolar mixture of TFE and $CO_2$. A 5.26 weight percent solution of 4P in HFC 43-10 is added by a high pressure pump to the autoclave at the flow rate of 10 mL/min for one minute, then reducing the flow rate to 0.0167 mL/min for the remainder of the polymerization. As TFE is consumed during the polymerization, the equimolar mixture of TFE and $CO_2$ is continuously added to keep the pressure of TFE constant throughout. After 5 hours, the initiator feed and TFE feed are stopped, and the autoclave is allowed to sit overnight so the remaining TFE is consumed.

The remaining $CO_2$ is then vented from the autoclave, and the solvent and excess monomer are removed by vacuum distillation at 120° C. and 20 mtorr, yielding 95 g of polymer resin with an equivalent weight of 775 g/mol.

Example A-2

TFE+POPS Copolymerization

A typical run involves adding 525 g of HFC 43-10 and 200 g of POPS to a 600-mL autoclave and degassing the solution by freeze-pump-thawing 5 times to remove all oxygen. The autoclave is then filled with nitrogen to 0 psig and heated to 35° C. with stirring at a rate of 200 rpm. Meanwhile, the initiator feed line is cooled to −30° C.

The autoclave is pressurized to 105 psig using equimolar mixture of TFE and $CO_2$. A 2.03 weight percent solution of 3P in HFC 43-10 is added by a high pressure pump to the autoclave at the flow rate of 14 mL/min for one minute, then reducing the flow rate to 0.0389 mL/min for the remainder of the polymerization. As TFE is consumed during the polymerization, the equimolar mixture of TFE and $CO_2$ is continuously added to keep the pressure of TFE constant throughout. After 5 hours the initiator feed and TFE feed are stopped, and the autoclave is allowed to sit overnight so the remaining TFE is consumed.

The remaining $CO_2$ is then vented from the autoclave. The solvent and excess monomer are removed by vacuum distillation at 120° C. and 20 mtorr, yielding 60 g of polymer with an equivalent weight of 700 g/mol.

Example A-3

PSEPVE Homopolymerization 124.25 g of degassed PSEPVE is added to a sealed glass reaction vessel which has previously been pacified with 3P initiator. 2.4 mL of a 3.38 weight percent solution of 3P in HEC 43-10 is added every 5 days, with the polymerization being carried out at 20° C. Five days after the fifth addition, the excess monomer is removed by vacuum distillation, yielding 36 g of PSEPVE homopolymer.

This polymer has been characterized by IR and TGA, showing 10% weight loss at 375° C. and 50% weight loss at 406° C. DSC shows a $T_g$ of 20.11° C. and a $T_m$ of 184° C.

Example A-4

POPS Homopolymerization 140 g of degassed POPS is added to a sealed glass reaction vessel which has previously been pacified with 3P initiator. 4.3 mL of a 3.38 weight percent solution of 3P in HFC 43-10 is added every 5 days, with the polymerization being carried out at 20° C. Five days after the fifth addition, the excess monomer is removed by vacuum distillation, yielding 33 g of the homopolymer.

This polymer has been characterized by IR and TGA, showing 10% weight loss at 365° C. and 50% weight loss at 402° C. DSC shows a $T_g$ of 44.02° C.

Example A-5

BULK Copolymerization

To a 100-mL stainless steel autoclave is added 149.42 g of degassed PSEPVE. The autoclave is heated to 45° C. at a stirring rate of 200 rpm. Using a pump, 2.3 mL of a 0.2324 M solution of 4P in perfluorohexane is added to the autoclave over 1 minute before pressurizing the autoclave to 55 psig with an equimolar mixture of TFE and $CO_2$. The polymerization is then allowed to react overnight as the TFE is consumed and the pressure drops. The resulting polymer had an EW of 500 g/mol by infrared spectroscopy.

Example A-6

BULK Polymerization 128 g of degassed PSEPVE is added to the 100-mL stainless steel autoclave. With the $CO_2$ scrubber installed, the TFE and $CO_2$ mixture is slowly added with the temperature on the six point thermocouple located in the scrubber being always below 50° C. The neat TFE is added to the autoclave and the pressure of neat TFE inside the autoclave head space is kept at 55 psig throughout the reaction with a stirring rate of 200 rpm. Using a pump, 4.0 mL of a 0.106 M solution of 3P in perfluorohexane is added to the autoclave over 1 minute followed by 5 hours of a 0.00667 mL/min addition rate. Resulting polymer had an EW of approximately 550 g/mol by infrared spectroscopy.

Step (B) Amidification

The amidification includes exposing the perfluorinated polymer resin (in —$SO_2$—F form) to ammonia to convert all —$SO_2$—F groups to sulfonamide groups, —$SO_2$—$NH_2$. The use of ammonia gas permits the amidification to be conducted in a solvent-free process where the perfluorinated polymer resin is processed in a solid state rather than being dissolved in a liquid solvent solution. Prior to the exposing of the perfluorinated polymer resin to ammonia gas, decreasing the particle size of the polymer resin by technologies, including but not limited to cryogrinding, increases polymer's contact surface area with ammonia gas, and therefore, reduces the reaction time and improves the reaction yield. The elimination of the solvent provides (i) a relatively clean reaction that reduces undesired by-products from side reactions with the solvent, (ii) easier collection of the product by simplifying product work-up. The following illustrate further examples of the amidification using ammonia gas, which can also be conducted in a solution (solvent) process.

Example (B)-1

Amidification of PSEPVE Homopolymer

For the preparation of sulfonimide form of homopolymer, the substrate was placed in a round bottom flask and heated slowly under vacuum until the polymer started to flow. Then the flask was rotated to form thin film of the homopolymer on an internal flask surface. The reaction flask cooled down and ammonia gas was added to reach 1 atm pressure. The ammonia was added from time to time to keep constant pressure of 1 atm in the reaction flask.

For the work-up, one of two methods below were applied:

1) Product was extracted by dry ACN, the solvent was evaporated and the product was dried at 100-120° C. under vacuum; and 2) Product was dissolved in an organic solvent, including but not limited to ethyl acetate or diethyl ether, and washed with water. The solution was dried over $MgSO_4$, the solvent was evaporated and the product was dried at 100-120° C. under vacuum.

The second method allowed for the removal of all $NH_4F$ from the polymer product. Starling from 3.5 g of PSEPVE homopolymer (7.85 mmol, in —$SO_2$—F form), 2.91 g of polymer product (in —$SO_2$—$NH_2$ form) was obtained with 84% yield.

Example (B)-2

Amidification of PSEPVE Homopolymer 6.67 g of PSEPVE homopolymer (in —$SO_2$—F form) was added to a flask and gaseous ammonia was added at 20° C. As ammonia was consumed, more was added to keep the pressure constant at 15 psig for 3 days. $NH_4F$ was removed at 100° C. and 20 mtorr. ACN was added to the resulting polymer and heated at 80° C. for 12 hours to dissolve the polymer. The solution was decanted off and the ACN was removed by distillation to yield 5.78 g of polymer product (in —$SO_2$—$NH_2$ form). This polymer product is well soluble in polar organic solvents, with a solubility of 100 mg/mL in ACN.

Example (B)-3

Amidification of TFE-PSEPVE Copolymer 4.00 g of the copolymer of PSEPVE and TFE with an EW of 775 was added to a Ni autoclave and $NH_3$ was added and maintained at 30 psig and 20° C. for 12 hours. The $NH_4F$ produced was removed by vacuum distillation at 100° C. and 20 mtorr. Two aliquots of 150 mL ACN was added and heated to 80° C. to dissolve the sulfonamide polymer product. The solution was decanted off and the ACN was removed by distillation to yield 3.46 g of polymer product (in —$SO_2$—$NH_2$ form). This polymer is soluble in polar organic solvents, with a solubility of 10 mg/mL in ACN and 25 mg/mL in N-methyl-2-pyrrolidinone.

Example (B)-4

Solution Amidification

An amount of 6.52 g of the copolymer of TFE and PSEPVE is dissolved in refluxing perfluorohexane. Ammonia is bubbled through the solution to maintain a high reflux rate for several hours at room temperature. The ammonia is allowed to boil away and the volatiles, including ammonium fluoride, are all removed by heating to 110° C. at 50 mtorr. Dry ACN is then added to the flask and heated to refluxing. After three extractions with ACN, 5.67 g of white product is obtained in 87% yield.

Step (C)—Gelation

In the gelation step, the perfluorinated polymer in sulfonamide form from the amidification step (B) reacts with a first chemical agent to convert at least a portion of the sulfonamide groups to SI groups and generate cross-linking side chains at the same time. As an example, the first chemical agent includes F—$SO_2$—Rf—$SO_2$—F and, optionally, $NH_2$—$SO_2$—Rf'—$SO_2$—$NH_2$, where Rf and Rf' are independently selected from —$(CF_2)_n$— where n is 1-6, or —$(CF_2)_{n'}$—O—$(CF_2)_{n'}$— where n' is 1-4. In further examples n is equal to or different than n'.

In embodiments, the gelation step can be conducted in either one or two step reactions. The one-step reaction includes co-adding F—$SO_2$—Rf—$SO_2$—F, $NH_2$—$SO_2$—Rf'—$SO_2$—$NH_2$ and the perfluorinated polymer in sulfonamide form into a reaction vessel with at least one polar solvent and at least one amine as catalyst. In examples, the polar solvent includes but not limited to ACN, 1,4-Dioxane, DMF, NMP and combinations thereof. The amine catalyst includes but not limited to trimethylamine (TMA), triethylamine (TEA), N,N-Diisopropylethylamine (DIPEA), 1,4-diazabicyclo[2.2.2]octane (DABCO) and combinations thereof. The reaction temperature can be approximately 25° C. to 100° C. or higher. In one example, the temperature is 50-80° C. The reaction time is several hours to up to one month, depending on the reaction reagents, ratio and reaction temperature.

The two-step reaction includes combining F—$SO_2$—Rf—$SO_2$—F and $NH_2$—$SO_2$—Rf'—$SO_2$—$NH_2$ first in a reaction vessel with at least one polar solvent and at least one amine as catalyst (as described above), to cause a reaction to produce linear SI-containing oligomers that terminate in a —$SO_2$—F at both ends. Then the perfluorinated polymer in sulfonamide form from the amidification step is added in the reaction solution to react with the linear SI-containing oligomers. In examples, F—$SO_2$—Rf—$SO_2$—F, $NH_2$—$SO_2$—Rf'—$SO_2$—$NH_2$ and TEA are combined in a reaction vessel with ACN and TEA. The mixture, is stirred under 50-80° C. for one hour to one week, producing a linear SI-containing oligomers with —$SO_2$—F groups on both ends. The perfluorinated polymer in sulfonamide form from the amidification step (optionally in ACN) is then added into the above reaction mixture. The reaction time is several hours to one month, depending on the reagents, ratio and reaction temperature.

In further examples, the one step or the two-step gelation includes combining X moles of the F—$SO_2$—Rf—$SO_2$—F, Y moles of the $NH_2$—$SO_2$—Rf'—$SO_2$—$NH_2$ and Z moles of the perfluorinated polymer (calculated by sulfonamide groups), according to an equation $X/(Y+0.5Z) \geq 1$, where X, Y and Z are variable, $X>0$, $Y \geq 0$ and $Z>0$.

Step (D) Post-Treatment

Optionally, after the above gelation step, the unreacted sulfonamide groups in the perfluorinated polymer can be further treated with a second chemical agent to convert to SI groups and terminate the side chains with either a —$CF_3$ or a —$SO_2$—F, where the —$SO_2$—F can be converted into a sulfonic acid group by a base solution treatment. For example, the second chemical agent, optionally with additional polar solvent and amine catalyst, is directly added into the reaction mixture from the above gelation step. Or the second chemical agent reacts with the isolated polymer product from the above gelation step in a reaction vessel with at least one polar solvent and at least one amine catalyst (as described above).

In a further example, the second chemical agent is selected from F—$SO_2$—Rf—$SO_2$—F, F—$SO_2$—(Rf-SI)$_m$—Rf—$SO_2$—F and F—$SO_2$—(Rf-SI)$_{m'}$—$(CF_2)_{m''}$—$CF_3$, where Rf is independently selected from —$(CF_2)_n$— where n is 1-6 and —$(CF_2)_{n'}$—O—$(CF_2)_{n'}$— where n' is 1-4, SI is sulfonimide, and m, m' and m" are 0-6, respectively.

Example C-1

To a 20-ml glass vial in a nitrogen-protected glove box, 223 mg (0.25 mmol) of a perfluorinated polymer in sulfonamide form from the amidification step, 188 mg (2.5 mmol) of F—$SO_2$—$(CF_2)_4$—$SO_2$—F, 0.35 ml (Aldrich >99.5%, 2.5 mmol) of TEA, and 0.64 ml (Aldrich, anhydrous) of ACN were added. The reaction mixture was heated at 50° C. and stirred for 5 hours to form yellow gel. The reaction mixture was then heated at 80° C. and stirred for 1 day. The product gel was slowly acidified in 1M HCl solution for 12 hours at room temperature. The acidified gel was purified by immersing into 30% $H_2O_2$ for 3 weeks at room temperature and dried in hood to give colorless product.

The EW of the isolated polymer product is measured to be approximately 500 g/mol by titration. No sulfonamide group was detected by infrared spectroscopy. The water uptake ratio is up to 540%, but the product polymer is insoluble in boiling water. Under 80° C. and a wide RH range (20-95% RH), the polymer product exhibited ~2.8 times proton conductivity of Nafion® 112 membrane.

Example C-2

The sulfonamide polymer from the amidification step (1.5 g, 2.14 mmol) was placed into vial and 9 mL of ACN was added. The reaction mixture was stirred until suspension formed, then F—$SO_2$—$(CF_2)_2$—$SO_2$—F (1.8 g, 6.77 mmol) and 2.5 mL of TEA were added. The reaction mixture was sonicated for 6 hours followed by stirring at 55-60° C. for 1 day. Then the reaction temperature was increased to 80-85° C. and reaction mixture was stirred for additional 1 day (One-step Gelation).

F—$SO_2$—$(CF_2)_2$—$SO_2$—F (1.8 g, 6.77 mmol), 3 mL of ACN and 2.5 mL of TEA was added to the reaction mixture, followed by 6-hour sonication, 1 day stirring at 55-60° C. and 1 day stirring at 80-85° C. (Post-treatment).

The reaction mixture was treated with KOH/$H_2O$/DMSO (15/35/50 wt %) solution at 80-90° C. for about 1 hour, washing with D.I. water, then acidified and purified as described in Example C-1 to give colorless isolated polymer product with 64% yield.

Example C-3

Two-Step Gelation

A solution of $NH_2$—$SO_2$—$(CF_2)_4$—$SO_2$—$NH_2$ (0.0654 g, 0.182 mmol) and F—$SO_2$—$(CF_2)_4$—$SO_2$—F (0.143 g, 0.374 mmol) in 0.4 mL of ACN and 0.1 mL TEA was stirred at 75-80° C. for 2.5 hours, giving F—$SO_2$—$((CF_2)_4$-SI$)_m$-$(CF_2)_4$—$SO_2$—F solution, where in is equal to 2 on average.

Half of the amount of the above F—$SO_2$—$((CF_2)_4$-SI$)_m$-$(CF_2)_4$—$SO_2$—F solution was added in a glove box to a solution of sulfonamide polymer from the amidification step (0.081 g, 0.182 mmol) in 0.3 mL of ACN and 0.1 mL of TEA. The reaction mixture was stirred for 64 hours at 55-60° C. (gelation occurred in ~10 hours). Then F—$SO_2$—$(CF_2)_4$—$SO_2$—F (0.07 g, 0.183 mmol), ACN (0.3 mL), TEA (0.1 mL) were added to the reaction mixture and the mixture was stirred additional 16 hours at 55-60° C. and 20 hours at 80-85° C. (post-treatment step). After work-up as described in above examples, the polymer product is isolated with a yield of 45%.

By changing the types of starting polymers, reaction agents, agents' ratio and/or reaction conditions, product polymers with various structures, different EW and different physical properties (including mechanical and proton conductivity properties) can be obtained. Both stirring and two-step gelation were useful to improve the product polymer yield.

Using the same method as described above, and starting from PSEPVE homopolymer, water-insoluble product polymer with high proton conductivity were obtained (shown in the FIGURE), where:

Type-1: by two-step gelation with F—$SO_2$—$(CF_2)_2$—O—$(CF_2)_2$—$SO_2$—F and $NH_2$—$SO_2$—$(CF_2)_4$—$SO_2$—$NH_2$;

Type-2: by two-step gelation with F—$SO_2$—$(CF_2)_4$—$SO_2$—F and $NH_2$—$SO_2$—$(CF_2)_4$—$SO_2$—$NH_2$;

Type-3: by one-step gelation with F—$SO_2$—$(CF_2)_4$—$SO_2$—F.

Although a combination of features is shown in the illustrated examples, not all of them need to be combined to realize the benefits of various embodiments of this disclosure. In other words, a system designed according to an embodiment of this disclosure will not necessarily include all of the features shown in the Structure 1 or all of the portions schematically shown in the Structure 1. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A method comprising:
providing a solid perfluorinated polymer resin comprising a perfluorinated carbon-carbon backbone and perfluorinated side chains that extend from the perfluorinated carbon-carbon backbone chain via an ether linkage and terminate in a sulfonyl fluoride group, —$SO_2$—F;
forming the solid perfluorinated polymer resin into microsized particles; exposing the microsized particles of the solid perfluorinated polymer resin to ammonia gas to convert the sulfonyl fluoride groups to sulfonamide groups, —$SO_2$—$NH_2$, thereby producing a perfluorinated polymer in sulfonamide form; and
contacting the perfluorinated polymer in sulfonamide form with one or more chemical agents to convert the sulfonamide groups to sulfonimide groups, —$SO_2$—NH—$SO_2$—, thereby producing a perfluorinated polymer electrolyte material that is 3-dimensionally cross-linked, has an equivalent weight (EW) of less than 850 g/mol, and is water-insoluble.

2. The method as recited in claim 1, wherein the solid perfluorinated polymer resin is a linear perfluorinated polymer resin and the providing of the solid perfluorinated polymer resin includes copolymerizing tetrafluoroethylene (TFE) and per-F vinyl ether monomers to produce the linear perfluorinated polymer resin.

3. The method as recited in claim 2, wherein a molar ratio of TFE to per-F vinyl ether monomers on average in the linear perfluorinated polymer resin is 3:1 or less.

4. The method as recited in claim 1, wherein the solid perfluorinated polymer resin is a perfluorinated homopolymer resin and the providing of the solid perfluorinated polymer resin includes polymerizing per-F vinyl ether monomers to produce the perfluorinated homopolymer resin.

5. The method as recited in claim 4, wherein the polymerizing is conducted using an initiator of bis(pentafluoropropionyl) peroxide or bis(heptafluorobutyryl) peroxide, and a fluorinated solvent selected from the group consisting of HFC 43-10 and perfluorohexane.

6. The method as recited in claim 1, wherein the exposing of the solid perfluorinated polymer resin to the ammonia gas includes adding additional ammonia gas to a reaction vessel containing the solid perfluorinated polymer resin in response to the ammonia gas being consumed by converting the sulfonyl fluoride groups to the sulfonamide groups.

7. The method as recited in claim 6, further comprising controlling a pressure of the ammonia gas in the reaction vessel to maintain a predetermined pressure while the sulfonyl fluoride groups are converted to the sulfonamide groups.

8. The method as recited in claim 1, wherein the one or more chemical agents includes F—$SO_2$—Rf—$SO_2$—F, where Rf is selected from the group consisting of —$(CF_2)_n$— where n is 1-6 and —$(CF_2)_{n'}$—O—$(CF_2)_{n'}$— where n' is 1-4.

9. The method as recited in claim 8, wherein the one or more chemical agents includes F—$SO_2$—$CF_2$—$SO_2$—F.

10. The method as recited in claim 8, wherein the one or more chemical agents includes F—$SO_2$—$(CF_2)_6$—$SO_2$—F.

11. The method as recited in claim 1, wherein the contacting the perfluorinated polymer in sulfonamide form with a first chemical agent of the one or more chemical agents produces a product polymer, and wherein the method further comprises, after the contacting of the perfluorinated polymer in sulfonamide form with the first chemical agent of the one or more chemical agents, treating the product polymer with more of the first chemical agent of the one or more chemical agents or a second chemical agent of the one or more chemical agents to convert unreacted sulfonamide groups to sulfonimide groups.

12. The method as recited in claim 11, wherein the converting the unreacted sulfonamide groups includes terminating side chains with sulfonyl fluoride groups, the sulfonyl fluoride groups being converted to sulfonic acid groups.

13. The method as recited in claim 11, wherein the one or more chemical agents are selected from the group consisting of F—SO$_2$—Rf—SO$_2$—F, F—SO$_2$—(Rf-SI)$_m$-Rf—SO$_2$—F, and F—SO$_2$—(Rf-SI)$_{m'}$-(CF$_2$)$_{m''}$—CF$_3$, wherein the Rf is independently selected from —(CF$_2$)$_n$— where n is 1-6 and —(CF$_2$)$_{n'}$—O—(CF$_2$)$_{n'}$— where n' is 1-4, the SI is —SO$_2$—NH—SO$_2$—, and m, m', and m'' are 0-6, respectively.

14. The method as recited in claim 1, wherein the perfluorinated polymer electrolyte material has an EW of 625 g/mol or less.

15. The method as recited in claim 8, wherein the one or more chemical agents further comprises NH$_2$—SO$_2$—Rf'—SO$_2$—NH$_2$, where Rf' is selected from the group consisting of —(CF$_2$)$_n$— where n is 1-6 and —(CF$_2$)$_{n'}$—O—(CF$_2$)$_{n'}$— where n' is 1-4.

16. The method as recited in claim 15, wherein the one or more chemical agents includes NH$_2$—SO$_2$—CF$_2$—SO$_2$—NH$_2$.

17. The method as recited in claim 15, wherein the one or more chemical agents includes NH$_2$—SO$_2$—(CF$_2$)$_6$—SO$_2$—NH$_2$.

18. The method as recited in claim 15, wherein the contacting of the perfluorinated polymer in sulfonamide form with the one or more chemical agents includes adding the F—SO$_2$—Rf—SO$_2$—F, the NH$_2$—SO$_2$—Rf'—SO$_2$—NH$_2$ and the perfluorinated polymer in sulfonamide form into a reaction vessel with at least one polar solvent and an amine catalyst.

19. The method as recited in claim 15, wherein the contacting the perfluorinated polymer in sulfonamide form with the one or more chemical agents includes combining the F—SO$_2$—Rf—SO$_2$—F and the NH$_2$—SO$_2$—Rf'—SO$_2$—NH$_2$ in a reaction vessel with an amine catalyst and a solvent to cause a reaction that produces a linear oligomer material with the sulfonyl fluoride end groups, and then combining the perfluorinated polymer in sulfonamide form and the linear oligomer material to convert the sulfonamide groups to the sulfonimide groups, thereby producing the perfluorinated polymer electrolyte material.

20. The method as recited in claim 15, wherein the contacting of the perfluorinated polymer in sulfonamide form with the F—SO$_2$—Rf—SO$_2$—F and the NH$_2$—SO$_2$—Rf'—SO$_2$—NH$_2$ includes combining X moles of the F—SO$_2$—Rf—SO$_2$—F, Y moles of the NH$_2$—SO$_2$—Rf'—SO$_2$—NH$_2$, and Z moles of the perfluorinated polymer in sulfonamide form, calculated by sulfonamide groups, according to an equation $X/(Y+0.5Z) \geq 1$, where X, Y, and Z are variable, $X>0$, $Y \geq 0$ and $Z>0$.

21. The method as recited in claim 1, wherein the perfluorinated polymer electrolyte material has an EW of 700 g/mol or less.

22. A method comprising:
   providing a solid perfluorinated homopolymer resin, the providing the solid perfluorinated homopolymer resin comprising polymerizing per-F vinyl ether monomers using an initiator of bis(pentafluoropropionyl) peroxide or bis(heptafluorobutyryl) peroxide to produce the solid perfluorinated homopolymer resin, the solid perfluorinated homopolymer resin comprising a perfluorinated carbon-carbon backbone and perfluorinated side chains that extend from the perfluorinated carbon-carbon backbone chain via an ether linkage and terminate in a sulfonyl fluoride group, —SO$_2$—F;
   forming the solid perfluorinated homopolymer resin into microsized particles; exposing the microsized particles of the solid perfluorinated homopolymer resin to ammonia gas to convert the sulfonyl fluoride groups to sulfonamide groups, —SO$_2$—NH$_2$, thereby producing a perfluorinated polymer in sulfonamide form; and
   contacting the perfluorinated polymer in sulfonamide form with one or more chemical agents to convert the sulfonamide groups to sulfonimide groups, —SO$_2$—NH—SO$_2$—, thereby producing a perfluorinated polymer electrolyte material that is 3-dimensionally cross-linked, has an equivalent weight (EW) of less than 850 g/mol, and is water-insoluble.

23. The method as recited in claim 22, wherein the polymerizing is conducted using a fluorinated solvent selected from the group consisting of HFC 43-10 and perfluorohexane.

* * * * *